United States Patent
Camuzzo Rojas et al.

(10) Patent No.: US 9,908,822 B2
(45) Date of Patent: Mar. 6, 2018

(54) PROCEDURE FOR OBTAINING SEAWEED SHEETS BY HEAT TREATMENT WITH ADDITION OF SALT AND BENTONITE FOR MAKING COVERS OF PENS OR PENCILS WITH ENCAPSULATED SEEDS AT THE END OF THEIR STRUCTURE

(71) Applicant: BIOPENCIL S.A., Lima (PE)

(72) Inventors: Luis Antonio Camuzzo Rojas, Lima (PE); Hernan Jesus Garrido Lecca Montanez, Lima (PE)

(73) Assignee: BIOPENCIL S.A., Lima (PE)

( * ) Notice: Subject to any disclaimer, the term of this patent is extended or adjusted under 35 U.S.C. 154(b) by 23 days.

(21) Appl. No.: 15/072,576

(22) Filed: Mar. 17, 2016

(65) Prior Publication Data
US 2016/0272550 A1    Sep. 22, 2016

(30) Foreign Application Priority Data
Mar. 17, 2015    (PE) .............................. 373-2015/DIN

(51) Int. Cl.
| | |
|---|---|
| *B43K 5/00* | (2006.01) |
| *B43K 19/00* | (2006.01) |
| *C05F 11/00* | (2006.01) |
| *C08L 89/00* | (2006.01) |
| *B43K 19/16* | (2006.01) |
| *B43K 8/00* | (2006.01) |
| *B43K 15/00* | (2006.01) |
| *B43K 19/14* | (2006.01) |
| *B43K 21/00* | (2006.01) |
| *B43K 29/00* | (2006.01) |
| *B43K 7/00* | (2006.01) |

(52) U.S. Cl.
CPC .............. *C05F 11/00* (2013.01); *B43K 5/005* (2013.01); *B43K 7/005* (2013.01); *B43K 8/003* (2013.01); *B43K 15/00* (2013.01); *B43K 19/14* (2013.01); *B43K 19/16* (2013.01); *B43K 21/006* (2013.01); *B43K 29/00* (2013.01); *C08L 89/00* (2013.01)

(58) Field of Classification Search
CPC ...... B43K 15/00; B43K 19/145; B43K 19/00; B43K 19/02–19/16; B43K 5/005; B43K 7/005; B43K 8/003; B43K 21/006; B43K 27/006
See application file for complete search history.

(56) References Cited

U.S. PATENT DOCUMENTS

| | | | |
|---|---|---|---|
| 2007/0189836 A1* | 8/2007 | Senga ................... | B43K 1/086 401/195 |
| 2010/0098475 A1* | 4/2010 | Fujita .................... | B43K 1/086 401/1 |

* cited by examiner

Primary Examiner — Carson Gross
(74) Attorney, Agent, or Firm — Sheridan Ross P.C.

(57) ABSTRACT

This invention relates to the process for obtaining sheets made from seaweed that, when wrapped around a coal mine, wax mine or ink loads, give rise to the cylindrical and elongated cover of pencil or pen made based on algae, salt, bentonite and water, with a final layer of cotton thread optionally, tinctured with natural plant elements and having seeds at its rear end.

The process for the production of films made from algae by heat treatment with the addition of salt and bentonite for making covers of pencil or pen comprises the following steps: i) boiling seaweed containing collagen for gelatinization together with salt and bentonite; ii) poring the gelatinized algae into the bowl and dip a graphite for writing; iii) subjecting to temperature for drying the algae and obtaining sheets; iv) cutting the sheets, according to the size of graphite for writing, leaving a space at the rear end to place the seeds; and iv) wrapping the graphite for writing with pieces of wet sheets to obtain a particular shape.

5 Claims, No Drawings

PROCEDURE FOR OBTAINING SEAWEED SHEETS BY HEAT TREATMENT WITH ADDITION OF SALT AND BENTONITE FOR MAKING COVERS OF PENS OR PENCILS WITH ENCAPSULATED SEEDS AT THE END OF THEIR STRUCTURE

CROSS-REFERENCE TO RELATED APPLICATION

This application claims the benefit of Peruvian Patent Application No. 373-2015/DIN filed Mar. 17, 2015, the entire contents of which are incorporated herein by reference in their entirety.

TECHNICAL FIELD

This process relates to the preparation of sheets made from seaweed, which when wrapped around a coal mine, ink loads, waxes or useful materials for writing may be used as pens or pencils.

With this material, pencils made from plant material, industrially stylized, in various colors and designs may be manufactured according to consumer preferences.

After finishing the use of pencils for writing, these may be planted thanks to seeds that may be contained at the end of their structure.

BACKGROUND

A big problem today is the deterioration of the environment, which may occur through pollution and deforestation.

In recent decades, this problem has resulted in a thinning of the ozone layer in the order of 3% every ten years, attributable to the presence of chlorofluorocarbons (CFCs) and halons in the atmosphere, gas families exclusively man-made produced by pollution generated mainly by large industries, according to information published by the World Meteorological Organization (WMO).

Following current trends of environmental protection, which has as one of its main slogans reducing, reusing and recycling, we have developed a material made from seaweed to be used as a cover to protect the coal mines, wax, or ink loads.

In this way, we will obtain a reduction of the gases released in the production of materials used conventionally, reusing the product thanks to the seeds they contain and recycling the material, considering that seaweeds, for their organic condition, have a period of degradation much less than the components used for the production of conventional materials.

Another important benefit of this invention is to reduce deforestation and get a material alternative to wood that is conventionally used for the manufacture of pencils, while encouraging environmental protection and increasing afforestation by seeding the seeds. This alternative material has the characteristic of being eco-effective.

The product to be obtained with the process will aim to use as desktop item, either by a pencil or pen.

One of the benefits of using this 100% natural hydrobiological material is that, thanks to its natural wear and tear, seaweeds have positive effects on the skin of the hands.

No chemicals or artificial products are required for processing, everything is done based on 100% natural products, thus avoiding contamination that is normally generated using plastic covers and deforestation in cases of using wood material.

For its organic condition, degradation of this material is faster than paper.

THE FOLLOWING IS KNOWN IN THE STATE OF THE ART

The patent KR2010007611A, registered in Korea, on behalf of Good Feel Co. Ltd. Gil-Seo Park, on the invention of a pencil involving preparation of a center made of graphite and rolling up a sheet of recycled paper outside the center. Recycled paper is produced by the application of sound waves to a residue. The pen is naturally dried at room temperature and is heated at a temperature of 100 to 130° C., without the use of chemical adhesives.

The technical advantage of this invention over the patent KR2010007611A aforementioned is that the biodegradable material will be obtained from seaweed by heat treatment adding salt and bentonite, unlike the previously registered which requires additional substances such as recycled paper fibers to reinforce the structure of the sheets obtained, while the seaweed sheets of this invention do not require paper or additional similar substances for their processing, as well as any type of seaweed containing collagen may be used, i.e., having gelatinization properties, such as *Gigartina chamissoi, Macrocystis phyrifera*, among others; in addition, the degradation of algae is faster than the paper.

The patent US20090028899A1, registered in the United States on behalf of Sugiyo KK, on the invention of the process for the production of pulp for paper and films from algae comprising the location of the algae in a tank with stirring and adding a chelating agent and water.

The technical advantage of this invention over the US20090028899A1 aforementioned is that throughout the treatment process of algae no chelating agent for processing the algae mass is added to convert them into sheets.

The patent filed under File No. 217-201/DIN-INDECOPI, granted by Resolution No. 000197-2015/DIN-INDECOPI, on the invention of the process for the production of films made from seaweed to be wrapped around of a coal mine, wax mine or ink loads give rise to the cylindrical and elongated cover made based on algae, water and seashells powder, with a final layer of cotton thread tinctured with natural plant elements having seeds at its rear end to be used with pencil or pen.

The technical advantage of this invention over the aforementioned patent is that salt and bentonite are used for obtaining seaweed sheets, which allow better preservation of the seed contained in the rear end and provides nutrient elements for better fertilization.

COMPONENTS AND THEIR PROPERTIES

Algae.—

Autotrophic tallophytes have a high content of organic substances. They are used as raw material for the extraction of iodine and potassium salts, some varieties are used to prepare agar-agar and other gelatin types used in microbiology and culinary arts. Given the continued increase in world population, not a few scientists consider algae as the solution for future food problems of humanity.

Seaweeds are classified within a group of primitive plants, equipped with pigments that are classified as blue, green, yellow, red or brown.

Seaweeds live and develop in fresh, salt or brackish water, their size can be microscopic or giant, some varieties get to measure more than 50 meters. They are a rich source of minerals like calcium, iron, potassium, silicon, phosphorus, magnesium and many others, but especially is one of the foods containing abundant organic iodine. They are rich in chlorophyll, carbohydrates and proteins, and several major vitamins. There are many varieties of them, spirulina, nori, wakame, *Gigartina chamissoi, Macrocystis phyrifera, Macrosystis integrifolia, Lessonia trabeculatta* and coshuro.

And, among others, it is the kelp, an alga growing on the surface of salt water and has some long branches with which it adheres to rocks and other surfaces. This is one of the algae with higher iodine content. Its color is dark brown.

Each alga has unique characteristics depending on the area and the place where they are, their nutritional characteristics vary according to water, climate, and ecosystem but generally all are rich in minerals, proteins and vitamins; algae contain a good contribution of vitamin C, A, E and many of B complex.

For the material composition, seaweed containing collagen, i.e., having gelling properties, may be used, such as *Gigartina chamissoi, Macrocystis phyrifera; Macrocystis intigrifolia;* travecultata, among other.

The seaweeds above are developed in the rich Peruvian sea and their cultivation is carried out in Peru expanding grasslands or forests of algae in the ocean, thus promoting oxygenation of the planet.

Salt.—

Common salt or sodium chloride decreases the water activity, prevents growth of microorganisms (on bacteria) and removes air and moisture to prevent survival of pathogens. It greatly increases the osmotic pressure of the cell tissues thus making difficult the penetration of diatomic oxygen $O_2$ and moisture enhancing mold. It produces an effect of reverse osmosis that causes bacteria exploit. Salt freezes few degrees below (0° C.) and to boil needs over 100° C.

Bentonite.—

Bentonite is very fine grained clay (colloidal) of montmorillonite type used in ceramics. The name derives from a reservoir located in Fort Benton, United States. The particle size is probably lower than 0.03% to the average grain of kaolinite. The normal type is that of calcium. The sodium type swells when it contacts the water. It is brown, although there is also a white bentonite. That type will give a better color in reduction that in oxidation when is used in porcelain bodies. It is a very sticky clay with a high degree of shrinkage (links between unit layers allow the entry of an amount of water higher that in kaolinite) and has a tendency to fracture during firing and cooling. For this reason, it should not work it alone or as the predominant material of a mass. Its great plasticity can be of great help to porcelain bodies. It also helps the suspension of varnish.

Water.—

Liquid substance formed by the combination of two volumes of hydrogen and one volume of oxygen, which is the most abundant component of the earth's surface.

Seed.—

Small seeds of ornamental trees, fruit trees or bushes, vegetables, legumes, vegetables, legumes, grasses and flowers among others, will be used. For example: chard, spinach, onion, tomato, carrot, parsley, anise, alfalfa, napier grass, sesame, flaxseed, quince, chamomile, lemon, orange, guava, apple, papaya, aguaymanto, beans, quinoa, amaranth and variety of flowers, among others.

Coal Mine (Graphite), Wax or Ink Load.
Percentages of Components:
1. Industrial Process:

| ALGAE: | 70% |
| SALT: | 1% |
| BENTONITE: | 29% |
| WATER: | 4 liters |

2. Traditional Process:

| ALGAE: | 98% |
| SALT: | 1% |
| BENTONITE: | 1% |
| WATER: | 4 liters |

In none of the processes the final product contains water.
5. Physical Properties of the Composition

| Color: | Natural seaweed color, it can also be dyed with 100% natural different plant elements such as beets, *eucalyptus*, coffee, berries, oranges, among others. |
| Brightness: | Vitreous dark. |
| Hardness: | Solid and light |
| Density: | 100% alga |
| Optics: | Moderate and soft relief to the touch |

DESCRIPTION

This invention relates to the process for obtaining sheets made from seaweed that when wrapped around a coal mine, wax mine (bar) or ink loads give rise to the cover of pen or pencil.

The methodology used to prepare the material from which covers are made is as follows:

A. Industrial Process
 1. Boil dried seaweed containing collagen for gelatinization together with salt and bentonite;
 2. Pour the gelatinized algae in the container and dip a graphite writing;
 3. Subject to temperature for drying algae and obtaining the adhesion of sheets to the graphite;
 4. Cut the sheets according to the size of the graphite for writing, leaving a space at the rear end to place the seeds; and,
 5. Wrap the graphite for writing with pieces of wet sheets in order to obtain a particular shape.

Another alternative for industrial method is the use of molds with shape of cylindrical cover to which the composition of gelatinized algae would be poured, and then proceed to dry or moisten graphite with the mixture and dehydrate.

B. Traditional Process:
 1. Boil the algae with salt and bentonite in order to promote gelatinization,
 2. Pour the gelatinized algae on a tray and then subject them to changes between high and low temperature to obtain lamination.
 3. Cut the sheet, according to the size of the coal mines, wax or ink loads leaving a space at the rear end to place the seeds.
 4. Wrap the coal mine, wax or ink loads with pieces of wet sheets to obtain the cylindrical shape and the desired thickness.

EXAMPLES OF APPLICATION OF THIS PRODUCT 7.1 Consistent and light pens and pencils of different designs, colors and scents are obtained, depending on the vegetable dye that is used.
7.2 Non-toxic material pencils and pens with low production costs are obtained.
7.3 Ergonomic pencils and pens can be manufactured according to Industrial Designs, even for use by lefthanders, since they can be adapted to be used by right and/or left hand.
7.4 Pencils for home use may be produced.

7.5 Upon completion of use for writing, pencil or pen may have a second use when in its development a seed is placed on the cover of pen or pencil, so once consumed, the seed contained in the cover can be planted. These seeds contained in the cover will be seeds of ornamental trees, fruit plants with fruits of domestic consumption, as small seeds of vegetables, legumes, and beans. For example: chard, spinach, onion, tomato, carrot, parsley, anise, alfalfa, sesame, flaxseed, chamomile, lemon, orange, aguaymanto, guava, apple, papaya and flowers, among others, all of them for own consumption. Thanks to the oxygenating properties of algae, these may serve to enrich the soil substrate, which will help the growth of cultivated plants.

7.6 With the planting of seeds for domestic consumption, creation of eco vegetable gardens in homes and study centers is encouraged.

7.7 With the planting of seeds for domestic consumption, self-consumption, ecological culture and sustainable development are encouraged.

7.8 The pens or pencils made from the material made from algae can be dyed through different techniques without losing their properties and the seed can be repowered according to the type of elements used for dyeing.

The invention claimed is:

1. A writing instrument, comprising:
   a base material for writing,
   one or more seaweed sheets wrapped around the base material to cover and protect the base material, the one or more seaweed sheets including collagen, salt and bentonite; and
   an end containing a plantable seed.

2. The writing instrument according to claim 1, wherein the percentage of components of a mixture that forms the one or more seaweed sheets before a drying operation is: 98% algae, 1% salt, 1% bentonite and 4 liters of water.

3. The writing instrument according to claim 1, wherein the one or more seaweed sheets prevent the growth of microorganisms and prevent survival of pathogens.

4. A method for making a cover of a writing instrument, the method comprising:
   a. boiling seaweed containing collagen with salt and bentonite to obtain gelatinized algae;
   b. forming a substrate of the gelatinized algae;
   c. subjecting the gelatinized algae to temperature for drying the gelatinized algae to obtain sheets;
   d. cutting the sheets according to the size of a base material of the writing instrument, leaving a space at a rear end to place one or more plantable seeds; and
   e. wrapping the base material with pieces of the sheets in order to obtain a particular shape of the writing instrument.

5. The method according to claim 4, further comprising:
   forming, prior to the boiling, a mixture that includes the seaweed, the salt, the bentonite, and water, wherein the mixture includes 98% seaweed, 1% salt, 1% bentonite, and wherein the boiling boils the mixture.

* * * * *